United States Patent

Eida et al.

[11] Patent Number: 5,258,505
[45] Date of Patent: Nov. 2, 1993

[54] TRISAZO COMPOUNDS, AND DYE COMPOSITIONS CONTAINING SAME

[75] Inventors: Tsuyoshi Eida, Yokohama; Mayumi Yamamoto, Tokyo; Takao Yamamoto, Isehara, all of Japan

[73] Assignee: Canon Kabushiki Kaisha, Tokyo, Japan

[21] Appl. No.: 858,604

[22] Filed: Mar. 27, 1992

[30] Foreign Application Priority Data

Jul. 26, 1991 [JP] Japan ................... 3-208721

[51] Int. Cl.⁵ ............ C09B 31/08; C09D 11/02; D06P 1/39
[52] U.S. Cl. .................. 534/680; 534/668; 534/728; 534/582; 534/859; 534/837; 534/581; 534/829; 534/887; 106/22 R; 106/23 R; 106/23 H; 106/23 K
[58] Field of Search .......... 534/668, 680, 528; 106/27, 23, 22 R, 23 R, 23 H, 23 K

[56] References Cited

U.S. PATENT DOCUMENTS

| 4,097,476 | 6/1978 | Wicki | 534/668 X |
| 4,120,854 | 10/1978 | Wicki | 534/680 X |
| 4,255,327 | 3/1981 | Brode | 260/173 |
| 4,804,411 | 2/1989 | Eida et al. | 106/22 |
| 4,841,037 | 6/1989 | Ohta et al. | 534/815 |
| 4,988,804 | 1/1991 | Langfeld | 534/684 |
| 5,082,496 | 1/1992 | Yamamoto et al. | 106/22 |
| 5,110,356 | 5/1992 | Shirota et al. | 106/22 |
| 5,127,946 | 7/1992 | Eida et al. | 534/680 X |

FOREIGN PATENT DOCUMENTS

| 0196900 | 10/1986 | European Pat. Off. | 534/680 |
| 2363603 | 6/1974 | Fed. Rep. of Germany | 534/680 |
| 49-039619 | 4/1974 | Japan | 534/680 |
| 55-144067 | 11/1980 | Japan | 106/22 |
| 55-152747 | 11/1980 | Japan | 534/668 |
| 59-093766 | 5/1984 | Japan | 106/22 |
| 59-093768 | 5/1984 | Japan | 106/22 |
| 61-285276 | 12/1986 | Japan | 534/668 |
| 62-010274 | 3/1987 | Japan | 106/22 |
| 62-289682 | 12/1987 | Japan | 534/680 |
| 63-045429 | 9/1988 | Japan | 106/22 |
| 63-220203 | 9/1988 | Japan | 534/680 |
| 1-135880 | 5/1989 | Japan | 106/22 |
| 1-167703 | 7/1989 | Japan | 534/680 |
| 1-193375 | 8/1989 | Japan | 106/22 |
| 3-000781 | 1/1991 | Japan | 106/22 |
| 3-000782 | 1/1991 | Japan | 106/32 |
| 3-294366 | 12/1991 | Japan | 534/680 |
| 3-294367 | 12/1991 | Japan | 534/680 |

Primary Examiner—Floyd D. Higel
Attorney, Agent, or Firm—Fitzpatrick, Cella, Harper & Scinto

[57] ABSTRACT

Disclosed herein is an azo compound represented by the formula

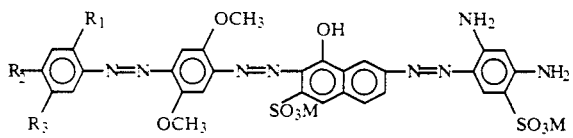

wherein $R_1$, $R_2$ and $R_3$ each are a group or atom selected from the group consisting of a hydrogen atom, alkyl groups having 1 to 4 carbon atoms, a methoxy group, halogen atoms, COOM and COOR$_4$ in which R$_4$ is an alkyl group having 1 to 4 carbon atoms, and M denotes an alkali metal atom, or an ammonium or organic ammonium ion. An ink containing this compound is suitable for use in an ink-jet recording.

19 Claims, 3 Drawing Sheets

TRISAZO COMPOUNDS, AND DYE COMPOSITIONS CONTAINING SAME

BACKGROUND OF THE INVENTION

1. Field of the Invention

The present invention relates to novel azo compounds, inks containing such azo compounds as a recording agent, and an ink-jet recording method and instrument making use of such inks. More specifically, this invention relates specifically to novel azo compounds suitable for use in the preparation of inks which can achieve high image density and improved water resistance when printing on non-coated paper such as woodfree paper, paper for copying, bond paper and paper for reporting, i.e., so-called plain paper, and which can provide images improved in indoor discoloration when recording on recording materials having on their surface an ink-receiving layer composed of a binder and a pigment, i.e., so-called coated paper, and to inks separately containing such azo compounds. This invention further relates to an ink-jet recording method and an instrument making use of such inks.

2. Related Background Art

Water-based inks with a water-soluble dye dissolved in an aqueous medium have heretofore been used as inks for ink-jet recording. Such conventional inks have been required to satisfy the following conditions:

(1) providing recorded images sufficient in density;
(2) having good drying characteristics on a recording material;
(3) providing recorded images on which feathering scarcely occurs;
(4) providing recorded images free from running, even when they come into contact with water, alcohol, etc., or sufficiently readable even when run out (high water resistance);
(5) providing recorded images excellent in light fastness;
(6) causing no clogging on the tip of a pen or nozzle;
(7) having no defects such as blurring of recorded images upon continuous recording or resumption of recording after being left for a long period of time (good jetting stability);
(8) being able to stored stably;
(9) raising no problem even when coming into contact with parts of a recording means during use; and
(10) offering no problem with respect to the safety of users. In addition, an ink-jet recording system making use of thermal energy requires:
(11) having excellent heat resistance and not adversely affecting a means for generating thermal energy.

These properties or characteristics may of course vary according to the composition of inks, and also are greatly controlled by the nature of a dye contained as a recording agent. It is easy to satisfy all the requirements for performances above by using conventional dyes.

As specific examples of such dyes, C.I. Food Black 2 has been principally used for the formation of both mono-color and full-color images, for example, in a field of ink-jet recording method (see Japanese Patent Application Laid-Open Nos. 59-93766 and 59-93768).

Inks making use of C.I. Food Black 2 are excellent in that sufficiently high-density images are provided, but a problem still remains with respect of light fastness and water resistance. Namely, the color of images printed with such an ink is changed from black to brown when exposed to indoor light for a long period of time or posted near a copying machine, resulting in remarkably deteriorated image quality (this very often occurs where the recording material is a coated paper sheet). A further problem is that the images become unreadable when water is poured out on to the images.

Japanese Patent Application Lid-Open Nos. 55-144067 and 61-285276 disclose inks, the storage stability and jetting responsibility of which have been improved by specifying the structure of a dye used. However, the water resistance of recorded images formed with such inks is still insufficient. In addition, the above-described problem of discoloration is not yet solved with respect to the former inks.

Further, Japanese Patent Application Laid-Open No. 1-135880 discloses inks, the jetting stability, water resistance of recorded images, etc. of which have been improved by introducing at least one specific structural unit in the structure of a dye used. In Japanese Patent Application Laid-Open No. 1-193375, black inks are disclosed having high affinity for recording materials, excellent fixing property and water resistance, and to capability of imparting good quality to images printed on plain paper. Japanese Patent Publication No. 62-10274 discloses inks taking account of jetting stability, light fastness of recorded images, etc.

In Japanese Patent Application Laid-Open Nos. 3-781 and 3-782, are disclosed inks that as hard to clog and scarce in discoloration. Japanese Patent Application Laid-Open Nos. 3-294366 and 3-294367 disclose inks that scarcely undergo discoloration.

Inks first require performances suited to the employed recording systems. After satisfying such performances, the inks are secondly required to exhibit excellent performance as a print, i.e., sufficient performance with respect to quality and fastness properties. However, it is considerably more difficult to satisfy all the above requirements than is apparent from the prior art.

Discoloration has heretofore not been recognized as a serious problem, but has come to attract more attention as a result of the fact that many other problems have been solved through advancement of technique. In particular, the problem is important for black inks which are used to a greater extent. In the case of full-color images, the discoloration of black ink rapidly lowers the quality of the images.

This discoloration proceeds even in a room not exposed to direct sunlight, and varies according to the kind of recording materials on which images are formed. Namely, the discoloration occurs remarkably in paper sheets containing a pigment such as silica. It has been impossible to solve this problem in C.I. Food Black 2, which has been widely used to date.

It has been attempted to solve the deficiency of C.I. Food Black 2 by choosing a dye having good light fastness. Satisfactory results have been accomplished as to plain paper. However, in the case of so-called coated papers obtained by forming an ink-receiving layer containing a pigment and a binder on a base material such as a paper web so as to enhance the image qualities of dye, such as color-producing property, brightness and resolution, significant discoloration has occurred even when inks, which have scarcely involved the problem with respect to the plain paper, have been used. Therefore, it has been impossible to solve such a problem by simply choosing a dye having good light fastness.

Besides, Japanese Patent Application Laid-Open No. 55-152747 discloses compounds similar to the compounds according to this invention, which serve to dye cellulosic fibrous materials, paper or leather black.

SUMMARY OF THE INVENTION

It is accordingly an object of this invention to provide novel azo compounds suitable for use as a recording agent in the preparation of inks which can provide images that are high in density, bright, free from undefined or irregular feathering and excellent in water resistance when printing on plain paper of various types, and are free from clogging and excellent in storage stability, heat stability and safety, and to provide inks separately containing such azo compounds, and an ink-jet recording method and an instrument making use of such inks Another object of this invention is to provide novel azo compounds suitable for use in the preparation of inks which can provide images scarcely undergoing discoloration even when recording on coated paper.

The above objects can be achieved by the present invention described below.

According to the present invention, there is thus provided an azo compound represented by the following general formula:

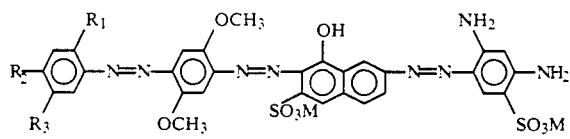

wherein $R_1$, $R_2$ and $R_3$ each are a group or atom selected from the group consisting of a hydrogen atom, alkyl groups having 1 to 4 carbon atoms, a methoxy group, halogen atoms COOM and COOR$_4$ in which $R_4$ is an alkyl group having 1 to 4 carbon atoms, and M denotes an alkali metal atom, or an ammonium or organic ammonium ion.

According to the present invention, there is also provided a black dye composition comprising, as a principal component, an azo compound represented by the following formula:

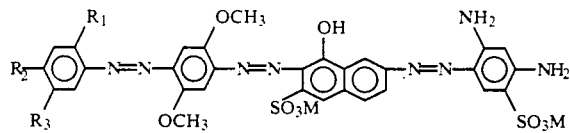

wherein $R_1$, $R_2$ and $R_3$ each are a group or atom selected from the group consisting of a hydrogen atom, alkyl groups having 1 to 4 carbon atoms, a methoxy group, halogen atoms, COOM and COOR$_4$ in which $R_4$ is an alkyl group having 1 to 4 carbon atoms, and M denotes an alkali metal atom, or an ammonium or organic ammonium ion.

According to the present invention, there is further provided an ink comprising a recording agent and a liquid medium dissolving or dispersing the recording agent therein, characterized in that the ink contains, as the recording agent, an azo compound represented by the following general formula:

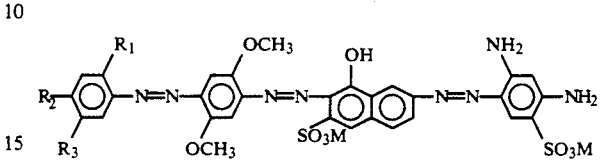

wherein $R_1$, $R_2$ and $R_3$ each are a group or atom selected from the group consisting of a hydrogen atom, alkyl groups having 1 to 4 carbon atoms, a methoxy group, halogen atoms, COOM and COOR$_4$ in which $R_4$ is an alkyl group having 1 to 4 carbon atoms, and M denotes an alkali metal atom, or an ammonium or organic ammonium ion, and an ink-jet recording method and an instrument making use of said ink.

DESCRIPTION OF THE PREFERRED EMBODIMENTS

Figure 1:
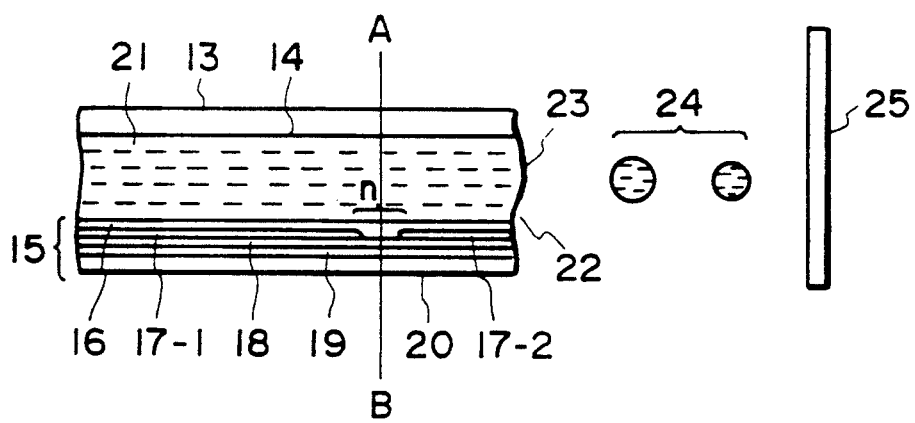
FIGS. 1 and 2 are a longitudinal cross section and a transverse cross section, respectively, of a head of an ink-jet recording apparatus.

By including a compound represented by the formula as a recording agent for an ink, the present invention provides an ink which can provide black images that are high in density and excellent in water resistance when recording on plain paper, and moreover, which can provide black images that scarcely undergo discoloration even upon recording on coated paper, and an ink-jet recording method and an instrument making use of such an ink.

The present invention will hereinafter be described in more detail with the reference following preferred embodiments.

As preferred specific examples of the azo compound (dye) represented by the formula and principally constituting a characteristic feature of this invention, may be mentioned the following compounds (dyes):

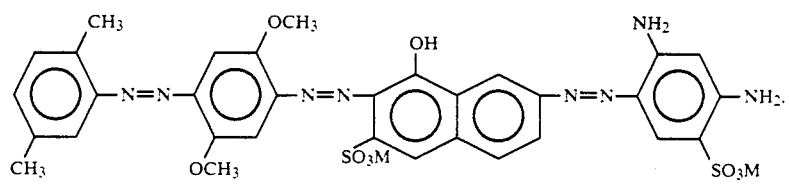

No. 1

-continued
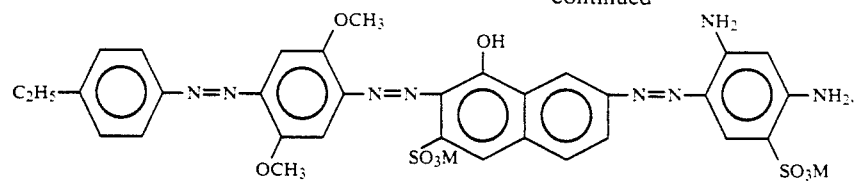 No. 2
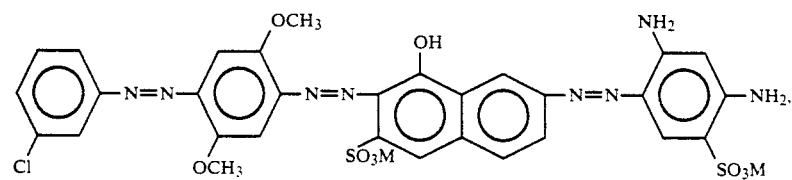 No. 3
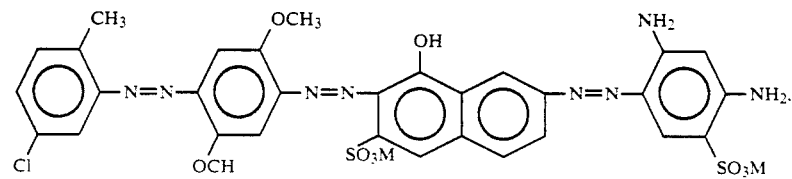 No. 4
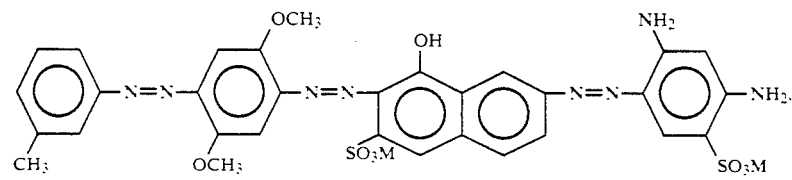 No. 5
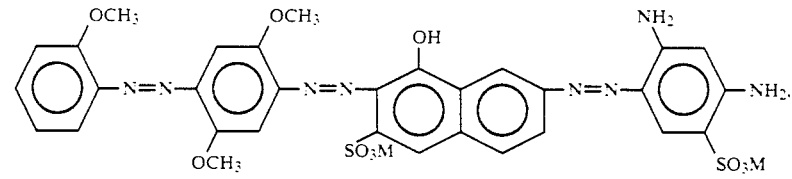 No. 6
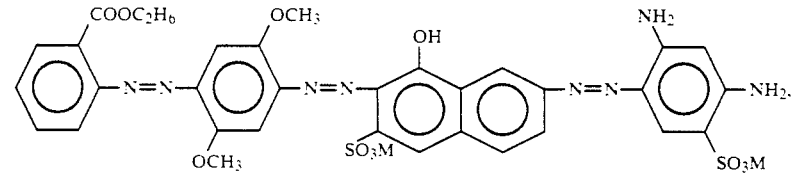 No. 7
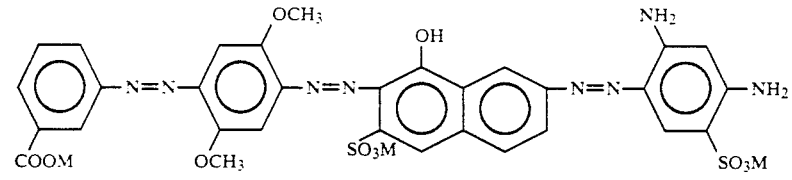 No. 8
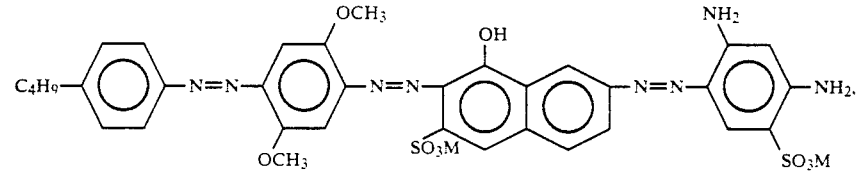 No. 9
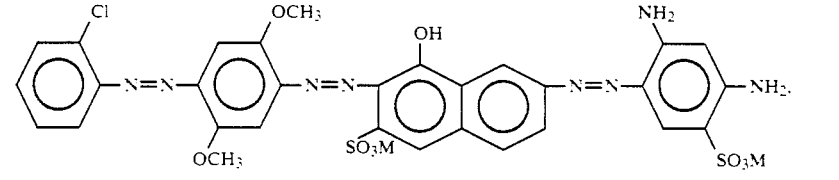 No. 10

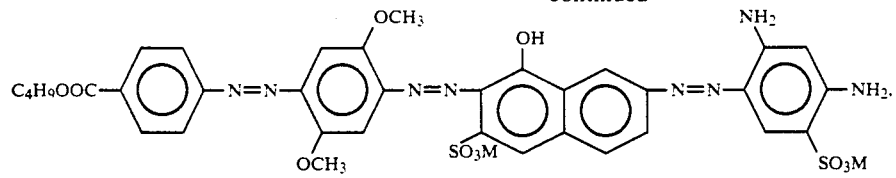
No. 11
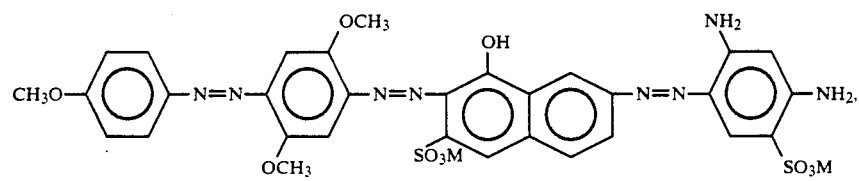
No. 12
wherein M means an alkali metal atom, or an ammonium or organic ammonium ion.
Of these, as further preferred specific examples, may be mentioned the following compounds:
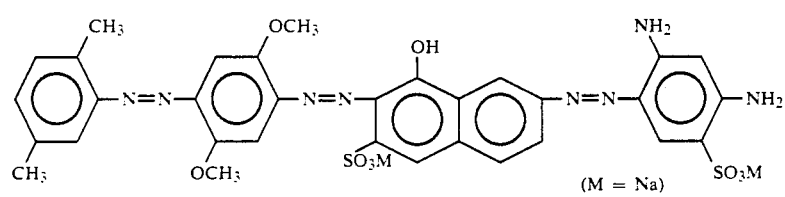
No. 1-1
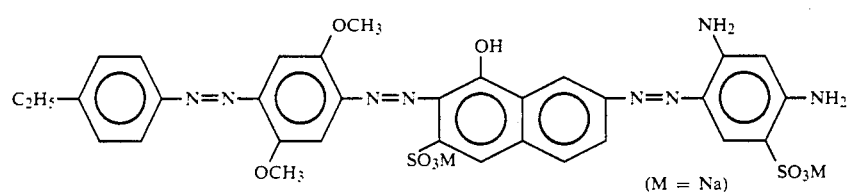
No. 2-1
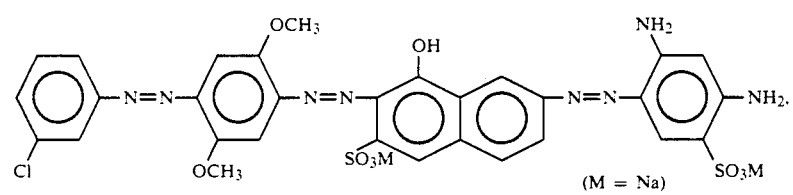
No. 3-1
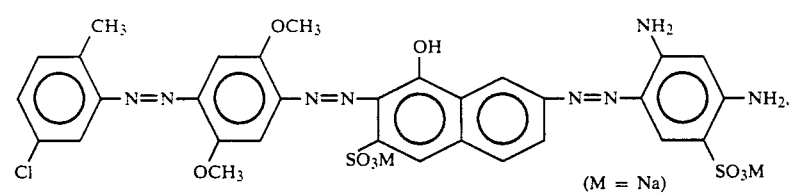
No. 4-1
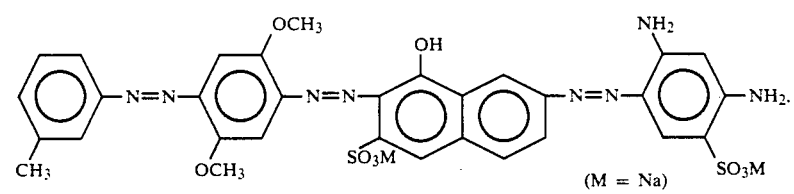
No. 5-1
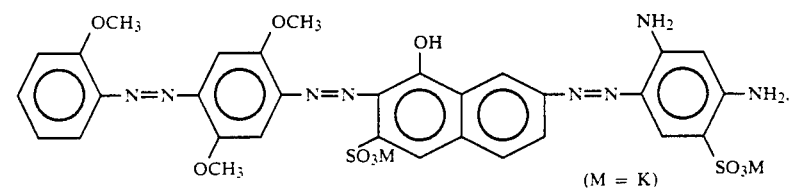
No. 6-1

-continued

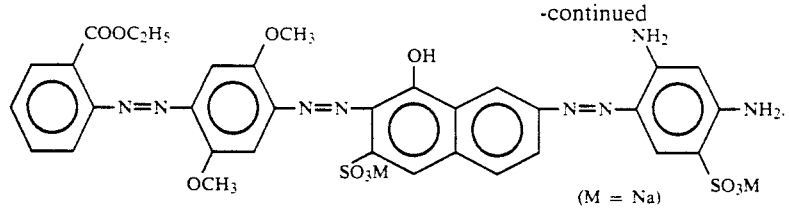
No. 7-1
(M = Na)

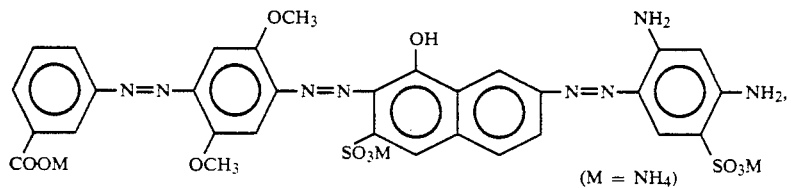
No. 8-1
(M = NH₄)

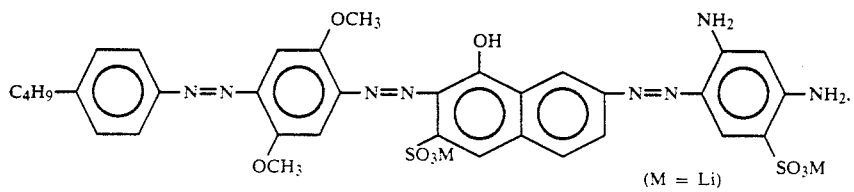
No. 9-1
(M = Li)

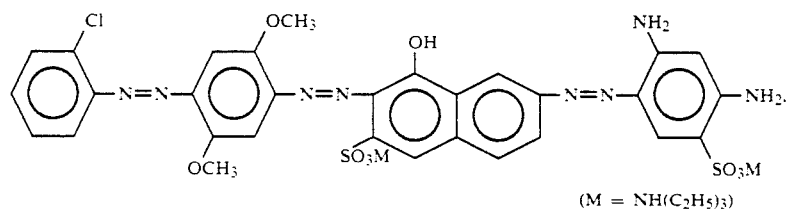
No. 10-1
(M = NH(C₂H₅)₃)

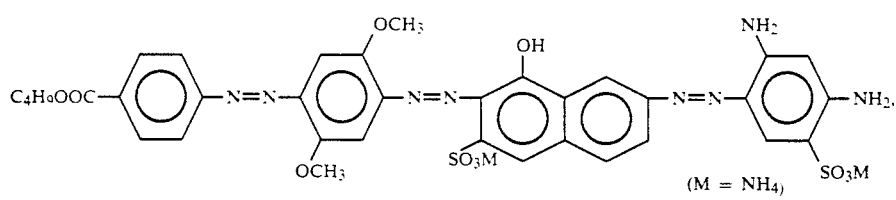
No. 11-1
(M = NH₄)

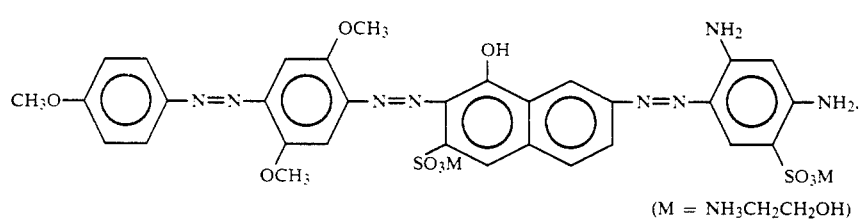
No. 12-1
(M = NH₃CH₂CH₂OH)

The azo compounds (dyes) according to this invention are generally the sodium salts with hydrophilic groups such as a sulfonic group, but are not limited to these sodium salts in the present invention. The compounds of this invention have the same effect as the sodium salts even when their counter ions are potassium, lithium, ammonium or organic amino ions. The present invention also embraces dyes containing these other counter ions. The dyes according to this invention can be satisfactorily used as black coloring matter.

The above dyes may be synthesized in the following manner in accordance with the process described in Yutaka Hosoda, "Riron Seizo: Senryo Kagaku (Theory and Preparation: Dyestuff Chemistry)" or the like.

SYNTHESIS EXAMPLE

The dye of Specific Example No. 3 is synthesized in the following manner. m-Chloroaniline is diazotized in accordance with the conventionally known method. The resulting diazotized amine is coupled with 2,5-dimethoxyaniline, and the resulting monoazo compound is separated to diazotize it. The resulting diazotized compound is coupled with gamma acid in alkaline conditions. The thus-formed disazo compound is separated to further diazotize it. The thus-formed diazotized compound is coupled with m-phenylenediamine-4-sulfonic acid. The thus-formed compound is salted out with sodium acetate and then washed with ethanol to purify it, thereby obtaining the intended dye.

The dye according to the present invention may be used either in the form of powder or in the form of an aqueous solution (liquid composition). In the latter case, it may also be possible to use a solubilizing agent for the dye in combination.

No particular limitation is imposed on the amount of the dye to be used in the ink according to the present invention. However, it preferably comprises generally from 0.1 to 15% by weight, preferably from 0.5 to 10% by weight, more preferably from 0.5 to 6% by weight of the total weight of the ink. The dyes of this invention may be used either singly or in combination with the conventionally known dyes.

The medium suitable for use in the ink according to this invention is water or a mixed solvent of water and a water-soluble organic solvent. As the water, compound it is preferable to use deionized water instead of tap water containing various ions.

As examples of the water-soluble organic solvent used in combination with water, may be mentioned alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketone alcohols such as acetone and diacetone alcohol; ethers such as dioxane; polyalkylene glycols such as polyethylene glycol and polypropylene glycol; alkylene glycols whose alkylene moiety has 2 to 6 carbon atoms, such as ethylene glycol, propylene glycol, butylene glycol, diethylene glycol, triethylene glycol, thiodiglycol and hexylene glycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lowe dialkyl ethers of polyhydric alcohols, such as triethylene glycol dimethyl (or diethyl) ether and tetraethylene glycol dimethyl (or diethyl) ether; sulfolane; N-methyl-2-pyrrolidone; 2-pyrrolidone; 1,3-dimethyl-2-imidazolidinone; and the like.

The above-mentioned organic solvents may be suitably chosen for use. In the case of the dyes of this invention, it is however preferable to use diethylene glycol or thiodiglycol, in particular, for the purpose of preventing the ink according to this invention from clogging. It is also preferable to use a nitrogen-containing cyclic compound or an ether compound of a polyalkylene oxide from the viewpoint of image density and jetting stability. Further, a lower alcohol or surface active agent may preferably be used from the viewpoint of frequency response. Therefore, preferred solvent compositions in this invention are those containing a variety of the components as described above in addition to water. The content of the water-soluble organic solvent in the ink is generally within a range of from 2 to 80% by weight, preferably from 3 to 70% by weight, more preferably from 4 to 60% by weight of the total weight of the ink.

The proportion of water to be used is generally within a range of from 10 to 97.5% by weight, preferably at least 35% by weight, more preferably at least 45% by weight of the total weight of the ink. When the amount of water is too little, a great amount of the low-volatile organic solvent remains in images formed, resulting in problems of migration of dye, feathering of the images, etc. It is hence not preferred to use water in such a small amount.

The inks of this invention may contain, in addition to the above components, a pH adjustor, viscosity modifier, surface tension modifier and/or the like as necessary. Examples of the pH adjustor may include various kinds of organic amines such as diethanolamine and triethanolamine; inorganic alkalis such as the hydroxides of alkali metals, for example, sodium hydroxide, lithium hydroxide, potassium hydroxide, etc.; salts of organic acids such as lithium acetate; and organic acids and mineral acids.

The inks of this invention as described above preferably have a viscosity of 1 to 20 cps, preferably 1 to 15 cps at 25° C., a surface tension of at least 30 dyn/cm, preferably at least 40 dyn/cm, and a pH of about 4 to 10.

The inks of this invention are effective for use in recording methods of an ink-jet recording system. Example of recording materials, may include any one of the general-purpose plain paper (for example, wood-free paper, medium-quality papers and bond paper), coated paper, plastic films for OHP, etc.

The inks of this invention are particularly suitable for use in an ink-jet recording system of a type that an ink is ejected by the bubbling phenomenon of the ink caused by thermal energy. This recording system has a feature that the ejection of the ink becomes extremely stable, and no satellite dots generated. In this case, the thermal properties (for example, the specific heat, the coefficient of thermal expansion, the heat conductivity, etc.) of the ink may however be controlled in some cases.

The inks according to this invention may suitably be used, in particular, in an ink-jet recording system of a type that recording is conducted by causing an ink to jet out by the action of thermal energy. It however goes without saying that the inks may also be used for general-purpose writing instruments.

As preferred methods and apparatus for conducting recording by using the ink according to this invention, may be mentioned a method and apparatus in which thermal energy corresponding to recording signals is applied to an ink within a recording head, and ink droplets are generated in accordance with the thermal energy.

Figure 2:
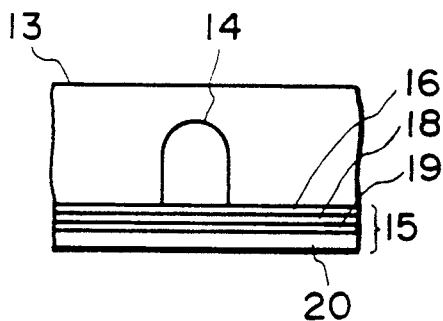
Figure 3:
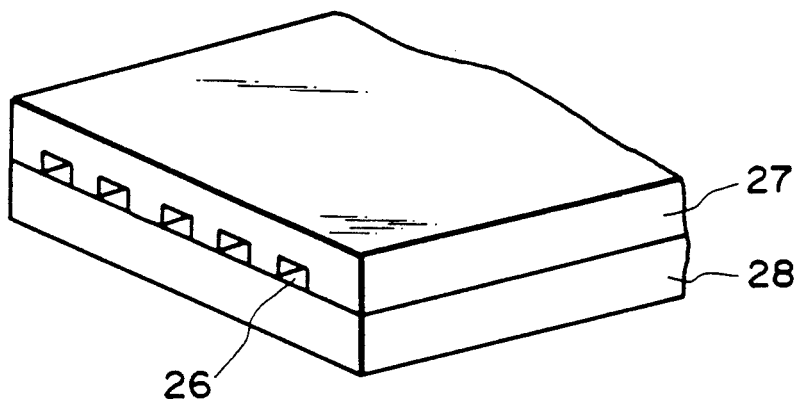
FIG. 3 is a perspective view of a multi-head which is an array of such heads as shown in FIGS. 1 and 2.

Examples of the construction of an head, which is a main component of such an apparatus, are illustrated in FIGS. 1, 2 and 3.

A head 13 is composed of a glass, ceramic or plastic plate or the like having an ink-passing channel 14 and a heating head 15, which is used for thermal recording (the drawing shows a head to which, however, the invention is not limited), said heating head 15 being bonded to the plate. The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 having good heat radiating property and made of alumina or the like.

An ink 21 comes up to an ejection orifice 22 (a minute opening) and forms a meniscus 23 owing to a pressure (not shown).

Upon application of electric signals to the electrodes 17-1, 17-2, the heating head 15 rapidly generates heat at the region shown by n to form bubbles in the ink 21 which is in contact with the region. The meniscus 23 of the ink is projected by the action of the pressure thus produced, and the ink 21 is ejected from the orifice 22 to a recording material 25 in the form of recording droplets 24. FIG. 3 illustrates an appearance of a multi-head composed of an array of a number of heads as shown in FIG. 1. The multi-head is formed by bonding a glass plate 27 having a number of channels 26 to a heating head 28 similar to the head as illustrated in FIG. 1.

Incidentally, FIG. 1 is a cross-sectional view of the head 13 taken along the flow path of the ink, and FIG. 2 is a cross-sectional view taken along line A—B in FIG. 1.

Figure 4:
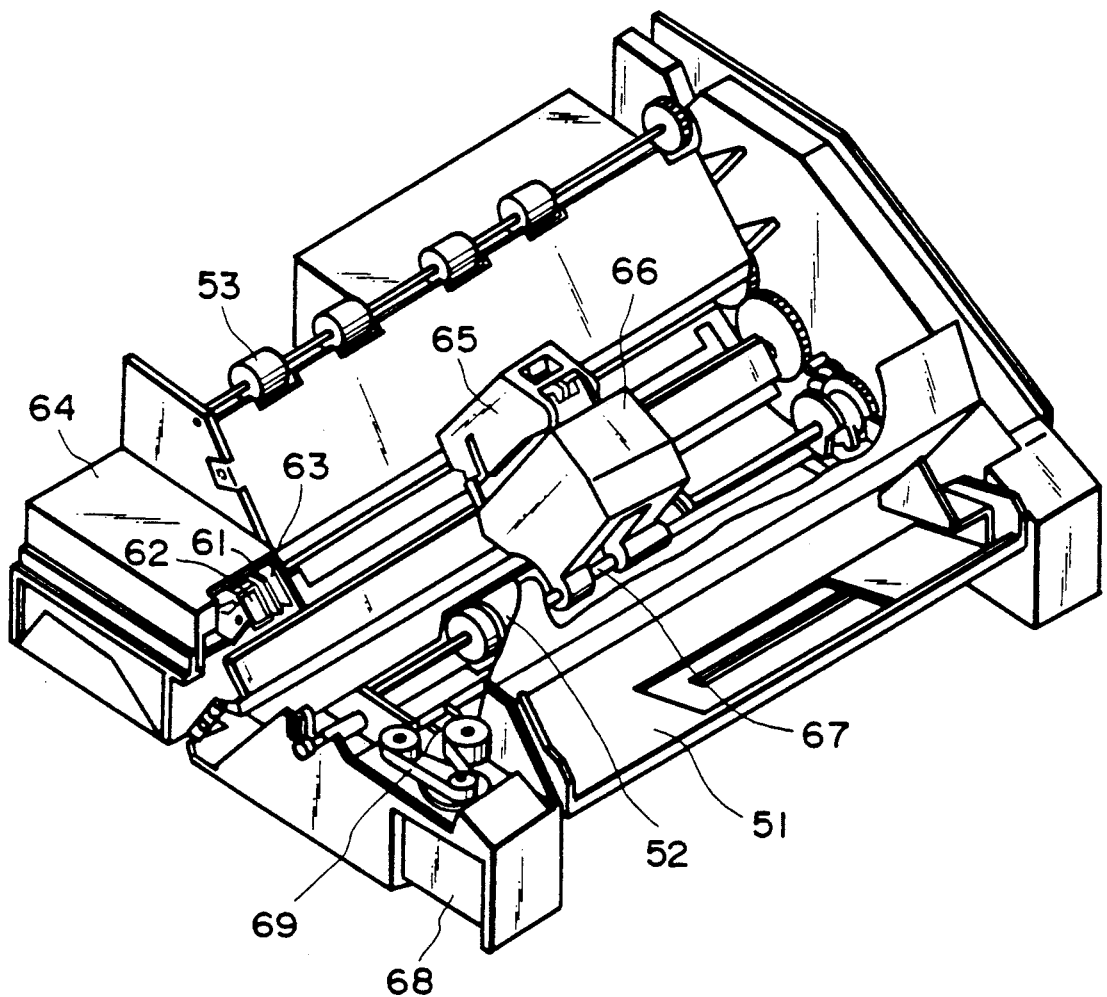
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at the position adjacent to the region in which a recording head operates, and in this embodiment, is held in such a form that it protrudes into the course through which the recording head is moved. Reference numeral 62 indicates a cap, which is provided at the home position adjacent to the blade 61, and is so constituted that it moves in the direction perpendicular to the direction in which the recording head is moved and comes into contact with the face of ejection openings to cap it. Reference numeral 63 denotes an ink-absorbing member provided adjoiningly to the blade 61 and, similar to the blade, is held in such a form that it protrudes into the course through which the recording head is moved. The above-described blade 61, cap 62 and absorbing member 63 constitute a recovery portion 64 for the recording head, where the blade 61 and absorbing member 63 remove water, dust and/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude in to the moving course of the recording head.

When the recording head 65 is moved from its home position to the position at which recording is started, the cap 62 and the blade 61 are at the same positions as the positions upon the wiping as described above. As a result, the ejection opening face of the recording head is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
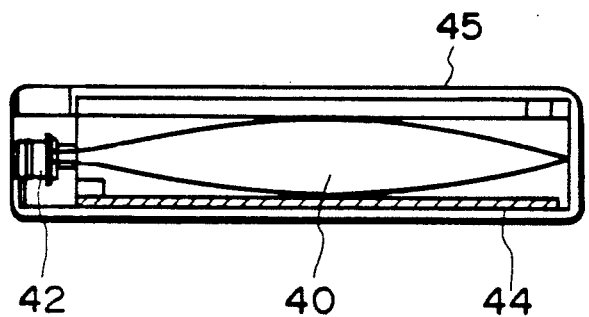
FIG. 5 is a longitudinal cross section of an illustrative ink cartridge.

FIG. 5 illustrates an exemplary ink cartridge in which an ink fed to the head through an ink-feeding member, for example a tube, is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink absorbing member for receiving a waste ink. It is preferred in this invention that the ink container portion is formed of a polyolefin, in particular, polyethylene, at its surface with which the ink comes into contact.

The ink-jet recording apparatus used in this invention may not be limited to the apparatus as described above in which the head and the ink cartridge are separately provided. Therefore, a device in which these members are integrally formed as shown in FIG. 6 can also be preferably used.

Figure 6:
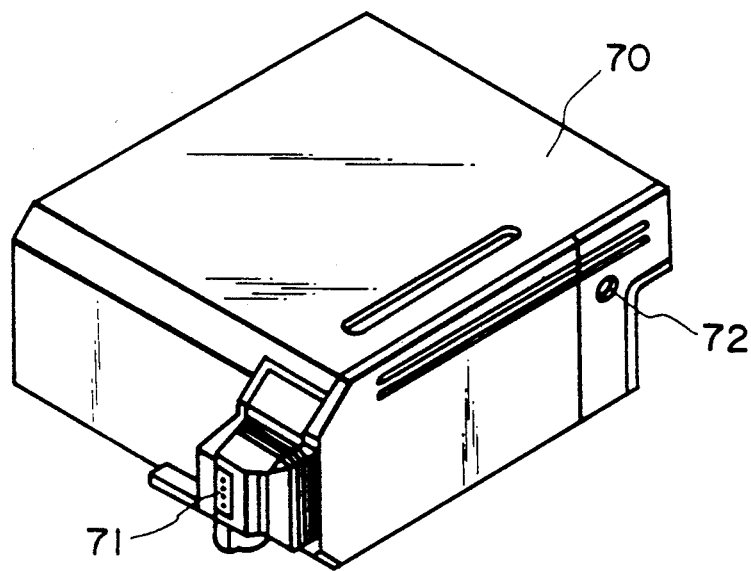
FIG. 6 is a perspective view of a recording unit.

In FIG. 6, reference numeral 70 designates a recording unit, in the interior of which an ink container portion containing an ink, for example an ink-absorbing member, is contained. The recording unit 70 is so constructed that the ink in such an ink-absorbing member is ejected in the form of ink droplets through a head 71 having a plurality of orifices. In this invention, polyurethane is preferably used as a material for the ink-absorbing member.

Reference numeral 72 indicates an air passage for communicating the interior of the recording unit 70 with the atmosphere.

The recording unit 70 can be used in place of the recording head shown in FIG. 4, and is detachably installed on the carriage 66.

EXAMPLES

The present invention will hereinafter be described more specifically by the following examples and comparative examples. Incidentally, all designations of "part" or "parts" as will be used in the following examples mean part or parts by weight unless expressly noted.

EXAMPLE 1

Synthesis of Dye No. 2-1

[1] Synthesis of monoazo compound (1) In 400 ml of water was dispersed 0.2 mole of dimethoxyaniline, to which hydrochloric acid was added to dissolve it. The resulting solution was filtered.

(2) In 300 ml of dilute hydrochloric acid was dissolved 0.2 mole of p-ethylaniline. 200 g of ice, 40 g of hydrochloric acid and an aqueous solution of 0.2 mole of sodium nitrite were added to the above-prepared solution. The resulting mixture was stirred for 30 minutes while cooling it with ice to effect diazotization, followed by the addition of sulfamic acid.

(3) The solution prepared in the step (1) was added with 200 g of ice, and the diazo liquid prepared in the step (2) was then poured while cooling with ice. At the same time, a 20% aqueous solution of sodium hydroxide was added to keep pH 3 to 4.

(4) After the thus-obtained reaction mixture was stirred for 3 hours under cooling with ice, 50 g of sodium chloride was added to effect salting-out The thus-obtained product was collected by filtration under suction. This product was dispersed in 1.5 l of dilute hydrochloric acid (pH: up to 1). The resulting dispersion was stirred and then added with 50 g of sodium chloride, followed by its filtration under suction.

[2]Synthesis of disazo compound (5) The thus-obtained monoazo compound in the form of a wet cake was dissolved in 300 g of dimethylformamide. 150 g of ice, 60 g of hydrochloric acid and an aqueous solution of 0.2 mole of sodium nitrite were added to the resulting solution. The resulting mixture was stirred for 2 hours while cooling it with ice to effect diazotization, followed by the addition of sulfamic acid.

(6) In 200 ml of water, 0.2 mole of gamma acid was dispersed. To the dispersion was added sodium hydroxide to dissolve gamma acid therein, followed by the addition of 200 g of ice.

(7) While cooling the resulting solution with ice, the diazo liquid prepared in the step (5) was poured therein. A 20% aqueous solution of sodium hydroxide was added to keep pH 9 to 10.

(8) After the thus-obtained reaction mixture was stirred for 5 hours under cooling with ice, 30 g of sodium acetate was added, and the resulting mixture was centrifuged. The thus-obtained precipitate was dissolved in 1.5 l of water, and the solution was added with 20 g of sodium acetate. The pH of the resulting mixture was adjusted to 4 with acetic acid, followed by its centrifugation.

[3]Synthesis of trisazo compound (9) The thus-obtained disazo compound in the form of a wet cake was dissolved in 300 g of dimethylformamide. 100 g of ice, 60 g of hydrochloric acid and an aqueous solution of 0.2 mole of sodium nitrite were added to the resulting solution. The resulting mixture was stirred for 2 hours while cooling it with ice to effect diazotization, followed by the addition of sulfamic acid.

(10) In 300 ml of water, 0.2 mole of m-phenylenediamine-4-sulfonic acid was dispersed. To the dispersion was added sodium hydroxide to dissolve the sulfonic acid therein, followed by the addition of 150 g of ice.

(11) While cooling the resulting solution with ice, the diazo liquid prepared in the step (9) was poured therein. The resulting mixture was stirred for 7 hours at a pH 4 to 5.

(12) To the reaction mixture thus obtained, 30 g of sodium acetate was added, and the resulting mixture was centrifuged. The thus-obtained precipitate was dispersed in 1 l of water, and the pH of the resulting dispersion was adjusted to 10. After adding 20 g of sodium acetate, the mixture was centrifuged.

(13) The thus-obtained precipitate was dispersed in 3 l of a 1:1 mixture of ethanol and water. After the resulting dispersion was heated to dissolve it, the solution was filtered. The filtrate was cooled, and the precipitate thus obtained was collected by filtration and dried, thereby obtaining the intended compound in a yield of 65 g. Its maximum absorption spectrum was 576 nm (in water).

EXAMPLE 2

Synthesis of Dye No. 3-1

The intended compound was synthesized in the same manner as in Example 1 except that m-chloroaniline was used in place of p-ethylaniline. Its maximum absorption spectrum was 578 nm (in water).

EXAMPLE 3

(Synthesis of Dye No. 4-1

The intended compound was synthesized in the same manner as in Example 1 except that 2-amino-4-chlorotoluene was used in place of p-ethylaniline. Its maximum absorption spectrum was 575 nm (in water).

EXAMPLE 4

Synthesis of Dye No. 5-1

The intended compound was synthesized in the same manner as in Example 1 except that m-toluidine was used in place of p-ethylaniline. Its maximum absorption spectrum was 575 nm (in water).

EXAMPLES 5 TO 16

(1) Preparation of inks

Inks having their corresponding compositions shown in the following Table 1 were prepared by mixing the respective components shown in Table 1 into solutions and filtering the resulting solutions through a filter having a pore size of 0.2 μm. Incidentally, all the dyes were thoroughly detailed and purified by a suitable means such as reverse osmosis or ultrafiltration before their use.

TABLE 1

| Example No. | Ink No. | Ink component | Amount used (part) |
|---|---|---|---|
| 5 | 1 | Dye No. 1-1 | 3 |
|  |  | Diethylene glycol | 22 |
|  |  | 2-Propanol | 3 |
|  |  | Purified water | 72 |
| 6 | 2 | Dye No. 2-1 | 2.5 |
|  |  | Ethylene glycol | 20 |
|  |  | Triethanolamine | 0.5 |
|  |  | Purified water | 77 |
| 7 | 3 | Dye No. 3-1 | 3 |
|  |  | Polyethylene glycol 300 | 17 |
|  |  | Thiodiglycol | 8 |
|  |  | 2-Propanol | 2 |
|  |  | Purified water | 70 |
| 8 | 4 | Dye No. 4-1 | 3 |
|  |  | Diethylene glycol | 15 |
|  |  | N-methyl-2-pyrrolidone | 5 |
|  |  | Triethanolamine | 2 |
|  |  | Purified water | 75 |
| 9 | 5 | Dye No. 5-1 | 2.5 |
|  |  | Thiodiglycol | 20 |
|  |  | 2-Propanol | 3 |
|  |  | Purified water | 74.5 |
| 10 | 6 | Dye No. 6-1 | 2.5 |
|  |  | Thiodiglycol | 15 |
|  |  | 2-Pyrrolidone | 5 |
|  |  | Triethanolamine | 0.5 |
|  |  | Purified water | 77 |
| 11 | 7 | Dye No. 7-1 | 3 |
|  |  | Diethylene glycol | 23 |
|  |  | 2-Propanol | 2 |
|  |  | Triethanolamine | 0.5 |
|  |  | Purified water | 71.5 |
| 12 | 8 | Dye No. 8-1 | 3.5 |
|  |  | Thiodiglycol | 20 |
|  |  | 2-Propanol | 3 |
|  |  | Purified water | 73.5 |
| 13 | 9 | Dye No. 9-1 | 3.5 |
|  |  | Diethylene glycol | 10 |
|  |  | Thiodiglycol | 10 |
|  |  | Ethanol | 3 |
|  |  | Purified water | 73.5 |
| 14 | 10 | Dye No. 10-1 | 3 |
|  |  | Thiodiglycol | 15 |
|  |  | Ethylene glycol | 5 |
|  |  | Triethanolamine | 0.5 |
|  |  | Purified water | 76.5 |
| 15 | 11 | Dye No. 11-1 | 3 |

TABLE 1-continued

| Example No. | Ink No. | Ink component | Amount used (part) |
|---|---|---|---|
| | | Polyethylene glycol | 15 |
| | | 2-Propanol | 3 |
| | | Purified water | 79 |
| 16 | 12 | Dye No. 12-1 | 3 |
| | | Diethylene glycol | 15 |
| | | Thiodiglycol | 5 |
| | | Triethanolamine | 0.5 |
| | | Purified water | 76.5 |

All the inks in the above examples were obtained satisfactorily as black inks.

(2) Application example of inks

The inks shown above in Table 1 were separately charged in a recording apparatus equipped with an On-Demand type multi-head (orifices size: 50×40 μm, drive voltage: 30 V, frequency: 4 kHz) which conducted recording by applying thermal energy to the ink in a recording head and forming ink droplets to evaluate their printing performance, jetting performance and storage stability after printing. The results are given in Table 2 which will be shown subsequently. The measurement methods and conditions of the evaluated respective properties are as follows:

(1) Dot density

Printing was conducted on commercially-available continuous business forms with all of the nozzles driven simultaneously to prepare a patch. After the thus obtained patch was air-dried for 24 hours in the interior of a room, its optical density was measured to rank it in accordance with the following standard:
A: Optical density of 1.31 or higher
B: Optical density of 1.26 to 1.30
C: Optical density of 1.10 to 1.25
D: Optical density of 1.09 or lower.

(2) Feathering occurrence

Three hundred dots were continuously printed on commercially-available continuous business forms so as not to overlap to one another. After the thus-obtained print was air-dried for 24 hours in the interior of a room, the number of dots on which undefined or irregular feathering occurred was counted through a microscope to rank the feathering occurrence in percentage in accordance with the following standard:
A: Not higher than 6%
B: 7 to 12%
C: 13 to 35%
D: Not lower than 35%.

(3) Fixing property (dryability of printed images)

The fixing property was evaluated by measuring the number of seconds required until a printed surface was no longer smeared when rubbed with a lens-cleaning paper upon elapsed time of 10, 20, 30, 40, 50 and 60 seconds respectively after printing English characters and numbers on commercially-available continuous business forms, and ranking the value in accordance with the following standard:
A: Not longer than 10 seconds
B: 11 to 20 seconds
C: 21 to 40 seconds
D: Not shorter than 41.

(4) Discoloration in room

Printing was conducted on a coated paper (designated paper for "Pixelpro TM "; product of Canon) with all of nozzles driven simultaneously to prepare a patch. The discoloration in room was evaluated by measuring the degree of discoloration after exposing the thus-obtained patch to indoor light for 3 months by a color difference meter to calculate $\Delta H^*$ (hue difference), and ranking the value in accordance with the following standard:
A: $\Delta H^*$ smaller than 5
B: $\Delta H^*$ of 5 to 19.99
C: $\Delta H^*$ not smaller than 20.

(5) Water resistance

Tap water was poured in a petri dish and left to stand. The patch evaluated in the test (1) was gently immersed in this petri dish, left over for 15 minutes and then dried.

(5a) The optical density was measured in the same manner as in the test (1) to calculate the percent retention of the optical density [(optical density after the immersion)/(optical density before the immersion)×100 (%)]. The water resistance was evaluated by ranking the value in accordance with the following standard:
A: Percent retention of optical density not lower than 90%
B: Percent retention of optical density of 80 to 89%
C: Percent retention of optical density of 60 to 79%
D: Percent retention of optical density not higher than 59.

(5b) The water resistance was evaluated by determining the degree of running of the dye in images printed on a paper sheet to redye or smear the blank portions of the paper sheet, thereby ranking the degree in accordance with the following standard:
A: Little smear
B: Slight smear
C: Considerable smear.

(6) Jetting stability

The jetting stability was evaluated by conducting printing on 100 sheets of continuous business forms and ranking it in accordance with the following standard:
A: No inferior parts
B: Impossible jetting or inferior parts of letters occurred.

(7) Anti-clogging (recovery property from sticking

After the printer was left for 1 month in a temperature controlled chamber at 60° C. and then for 24 hours at room temperature, recovery operation (sucking operation by a pump) was conducted, followed by resumption of printing. The anti-clogging was evaluated by ranking it in accordance with the following standard:
A: Normal printing could be resumed by two or less recovery operations
B: Normal printing could be resumed by three to five recovery operations
C: Impossible jetting or inferior parts of letters occurred even by six to ten recovery operations.

(8) Storage stability

Each of the inks was placed in an amount of 100 ml in a heat-resistant glass bottle and hermetically sealed therein to store it for 3 months in a temperature controlled chamber at 60° C. Using this ink, printing was conducted on 100 sheets of continuous business forms to evaluate the storage stability of the ink by ranking it in accordance with the following standard:
A: No inferior parts
B: Impossible jetting, inferior parts of letters, or color fading or discoloration occurred.

TABLE 2

| Example No. | Properties evaluated on items | | | | | | | | |
|---|---|---|---|---|---|---|---|---|---|
| | (1) | (2) | (3) | (4) | (5a) | (5b) | (6) | (7) | (8) |
| 5 | B | A | B | A | A | A | A | A | A |
| 6 | A | A | B | A | A | A | A | A | A |
| 7 | B | B | A | A | A | A | A | A | A |
| 8 | A | B | A | A | A | A | A | A | A |
| 9 | A | B | A | A | A | A | A | A | A |
| 10 | B | A | B | A | A | A | A | A | A |
| 11 | A | A | B | A | A | A | A | A | A |
| 12 | A | B | A | A | A | A | A | A | A |
| 13 | B | A | B | A | A | A | A | A | A |
| 14 | B | B | A | A | A | A | A | A | A |
| 15 | A | B | A | A | A | A | A | A | A |

TABLE 2-continued

| Example No. | Properties evaluated on items | | | | | | | | |
|---|---|---|---|---|---|---|---|---|---|
| | (1) | (2) | (3) | (4) | (5a) | (5b) | (6) | (7) | (8) |
| 16 | B | B | A | A | A | A | A | A | A |

COMPARATIVE EXAMPLES 1 TO 12

Using their corresponding dyes shown in the following Table 3, inks shown in the following Table 4 were prepared and evaluated in the same manner as in Examples 5 to 16. The results are given in Table 5 shown below.

TABLE 3

| Dye No. | Structure formula |
|---|---|
| 13 | [structure] |
| 14 | [structure] |
| 15 | [structure] |
| 16 | [structure] |
| 17 | [structure] |
| 18 | [structure] |

TABLE 3-continued

| Dye No. | Structure formula |
|---|---|
| 19 | (structure) |
| 20 | (structure) |
| 21 | (structure) |
| 22 | (structure) |
| 23 | (structure) |
| 24 | (structure) |

TABLE 4

| Comparative Example No. | Ink No. | Ink component | Amount used (part) |
|---|---|---|---|
| 1 | 13 | Dye No. 13 in Table 3 | 3 |
| | | Diethylene glycol | 22 |
| | | 2-Propanol | 3 |
| | | Purified water | 72 |
| 2 | 14 | Dye No. 14 in Table 3 | 2.5 |
| | | Ethylene glycol | 20 |
| | | Triethanolamine | 0.5 |
| | | Purified water | 77 |
| 3 | 15 | Dye No. 15 in Table 3 | 3 |
| | | Polyethylene glycol 300 | 17 |
| | | Thiodiglycol | 8 |
| | | 2-Propanol | 2 |
| | | Purified water | 70 |
| 4 | 16 | Dye No. 16 in Table 3 | 3 |
| | | Diethylene glycol | 15 |
| | | N-methyl-2-pyrrolidone | 5 |
| | | Triethanolamine | 2 |
| | | Purified water | 75 |
| 5 | 17 | Dye No. 17 in Table 3 | 2.5 |
| | | Thiodiglycol | 20 |
| | | 2-Propanol | 3 |
| | | Purified water | 74.5 |
| 6 | 18 | Dye No. 18 in Table 3 | 2.5 |
| | | Thiodiglycol | 15 |
| | | 2-Pyrrolidone | 5 |
| | | Triethanolamine | 0.5 |

TABLE 4-continued

| Comparative Example No. | Ink No. | Ink component | Amount used (part) |
|---|---|---|---|
| 7 | 19 | Purified water | 77 |
| | | Dye No. 19 in Table 3 | 3 |
| | | Diethylene glycol | 23 |
| | | 2-Propanol | 2 |
| | | Triethanolamine | 0.5 |
| 8 | 20 | Purified water | 71.5 |
| | | Dye No. 20 in Table 3 | 3.5 |
| | | Thiodiglycol | 20 |
| | | 2-Propanol | 3 |
| 9 | 21 | Purified water | 73.5 |
| | | Dye No. 21 in Table 3 | 3.5 |
| | | Diethylene glycol | 10 |
| | | Thiodiglycol | 10 |
| | | Ethanol | 3 |
| 10 | 22 | Purified water | 73.5 |
| | | Dye No. 22 in Table 3 | 3 |
| | | Thiodiglycol | 15 |
| | | Ethylene glycol | 5 |
| | | Triethanolamine | 0.5 |
| 11 | 23 | Purified water | 76.5 |
| | | Dye No. 23 in Table 3 | 3 |
| | | Polyethylene glycol | 15 |
| | | 2-Propanol | 3 |
| 12 | 24 | Purified water | 79 |
| | | Dye No. 24 in Table 3 | 3 |
| | | Diethylene glycol | 15 |
| | | Thiodiglycol | 5 |
| | | Triethanolamine | 0.5 |
| | | Purified water | 76.5 |

TABLE 5

| Comparative Example No. | Properties evaluated on items | | | | | | | | |
|---|---|---|---|---|---|---|---|---|---|
| | (1) | (2) | (3) | (4) | (5a) | (5b) | (6) | (7) | (8) |
| 1 | B | A | A | C | A | C | B | C | A |
| 2 | B | B | A | C | A | C | B | C | A |
| 3 | A | B | B | C | A | C | B | B | A |
| 4 | A | A | A | C | A | B | B | C | A |
| 5 | B | A | B | C | B | C | B | B | A |
| 6 | A | A | B | C | B | C | B | B | A |
| 7 | B | B | A | C | A | B | B | B | A |
| 8 | B | A | B | A | C | C | A | A | A |
| 9 | B | B | B | A | C | B | A | A | A |
| 10 | A | B | A | A | D | C | A | A | A |
| 11 | A | A | B | A | D | C | A | A | A |
| 12 | B | A | B | B | C | C | B | A | A |

As has been described above, the present invention can provide inks satisfying various performance characteristics required for printed images on plain paper, to say nothing of water resistance, by using the compounds (dyes) represented by the formula as a dye in the inks. In addition, the present invention can provide black images which are high in quality, excellent in resolution, and scarcely undergo discoloration and are excellent in fastness properties even when printing on coated paper.

The inks of this invention can exhibit the above properties even at their pH 4 to 10 near the neutrality. Therefore, they do no require the addition of a strongly alkaline substance as described in Japanese Patent Application Laid-Open No. 56-57862 and hence, are also favorable from the viewpoint of safety.

Further, even when the inks according to this invention are applied to an ink-jet recording method in which an ink is ejected by the action of thermal energy, they undergo no formation of deposit on a heater used in this method and can be used stably over a long period of time. Changes of the physical properties and deposition of solid matter are not recognized during their storage.

What is claimed is:

1. An azo compound represented by the formula

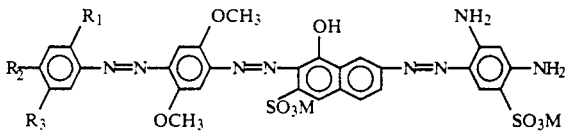

wherein $R_1$, $R_2$ and $R_3$ each are selected from the group consisting of hydrogen, an alkyl having 1 to 4 carbon atoms, methoxy, halogen, COOM and COOR$_4$, and in which $R_4$ is an alkyl having 1 to 4 carbon atoms, and M denotes an alkali metal, ammonium or at least one of ethylammonium and ethanol ammonium.

2. The azo compound according to claim 1, which is selected from the group consisting of the following compounds No. 1 through No. 12:

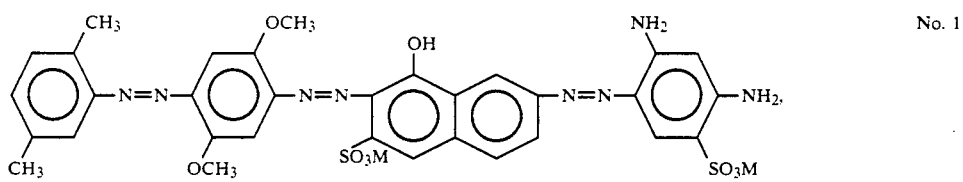

No. 1

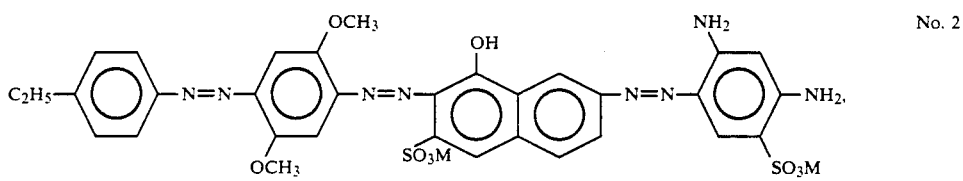

No. 2

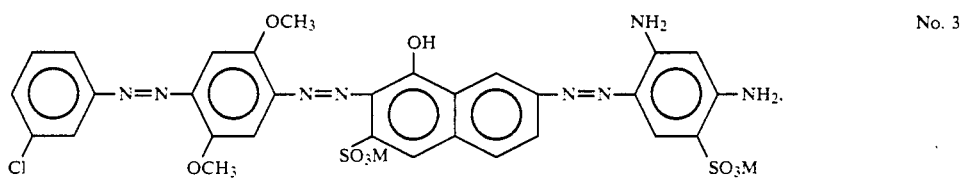

No. 3

-continued
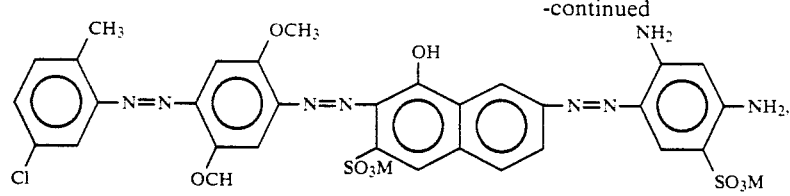
No. 4
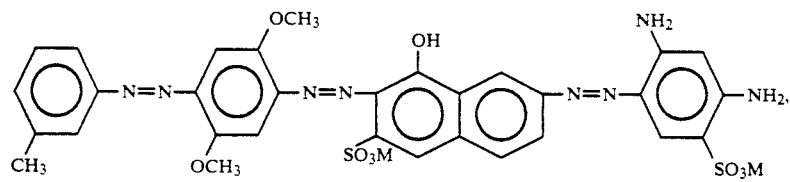
No. 5
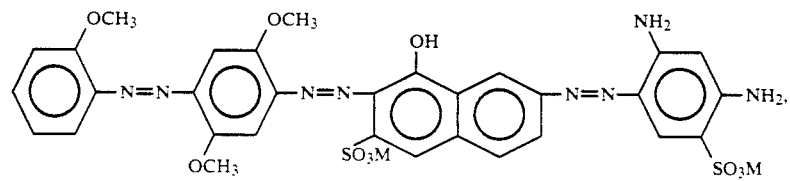
No. 6
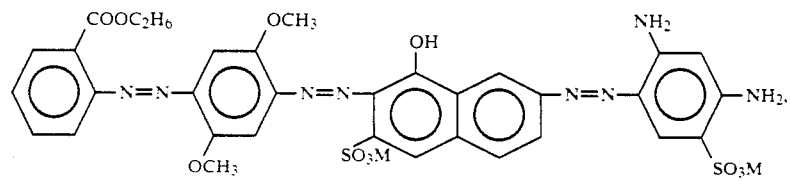
No. 7
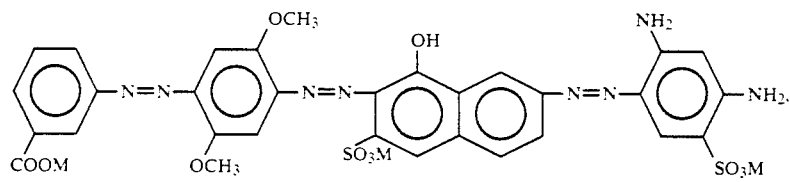
No. 8
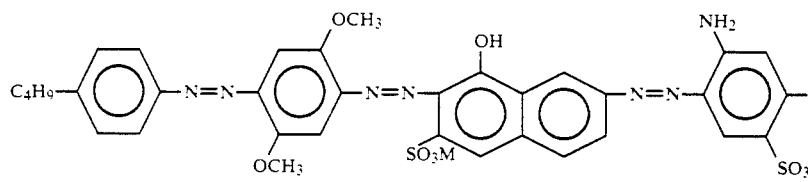
No. 9
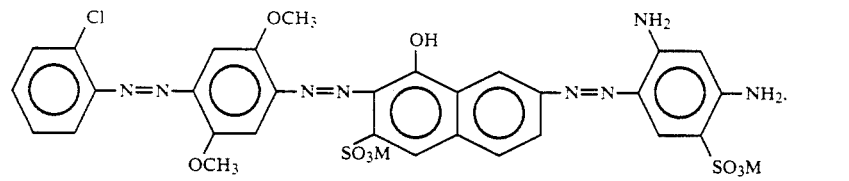
No. 10
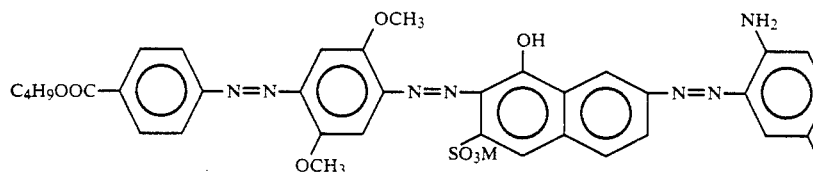
No. 11
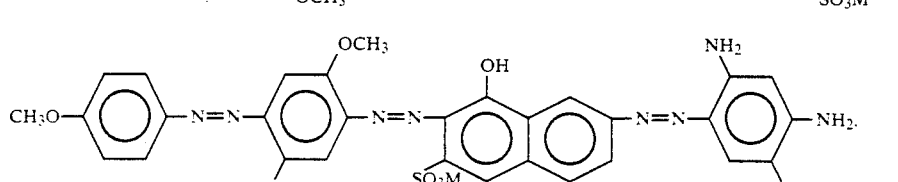
No. 12 wherein M means an alkali metal atom, or an ammonium or organic ammonium ion.

3. A black dye composition comprising, as a principal component, an azo compound represented by the formula

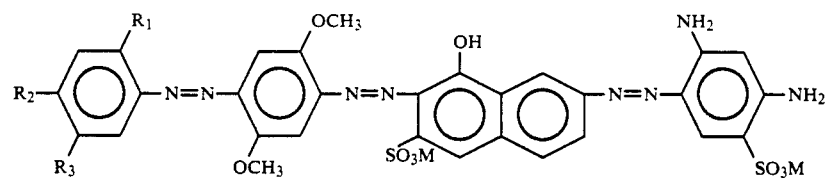

wherein $R_1$, $R_2$ and $R_3$ each are selected from the group consisting of hydrogen, an alkyl having 1 to 4 carbon atoms, methoxy, halogen, COOM and COOR$_4$, and in which $R_4$ is alkyl having 1 to 4 carbon atoms, and M denotes an alkali metal, ammonium or at least one of ethylammonium and ethanol ammonium.

4. The black dye composition according to claim 3, which comprises, as a principal component, an azo compound selected from the group consisting of the following compounds No. 1 through No. 12:

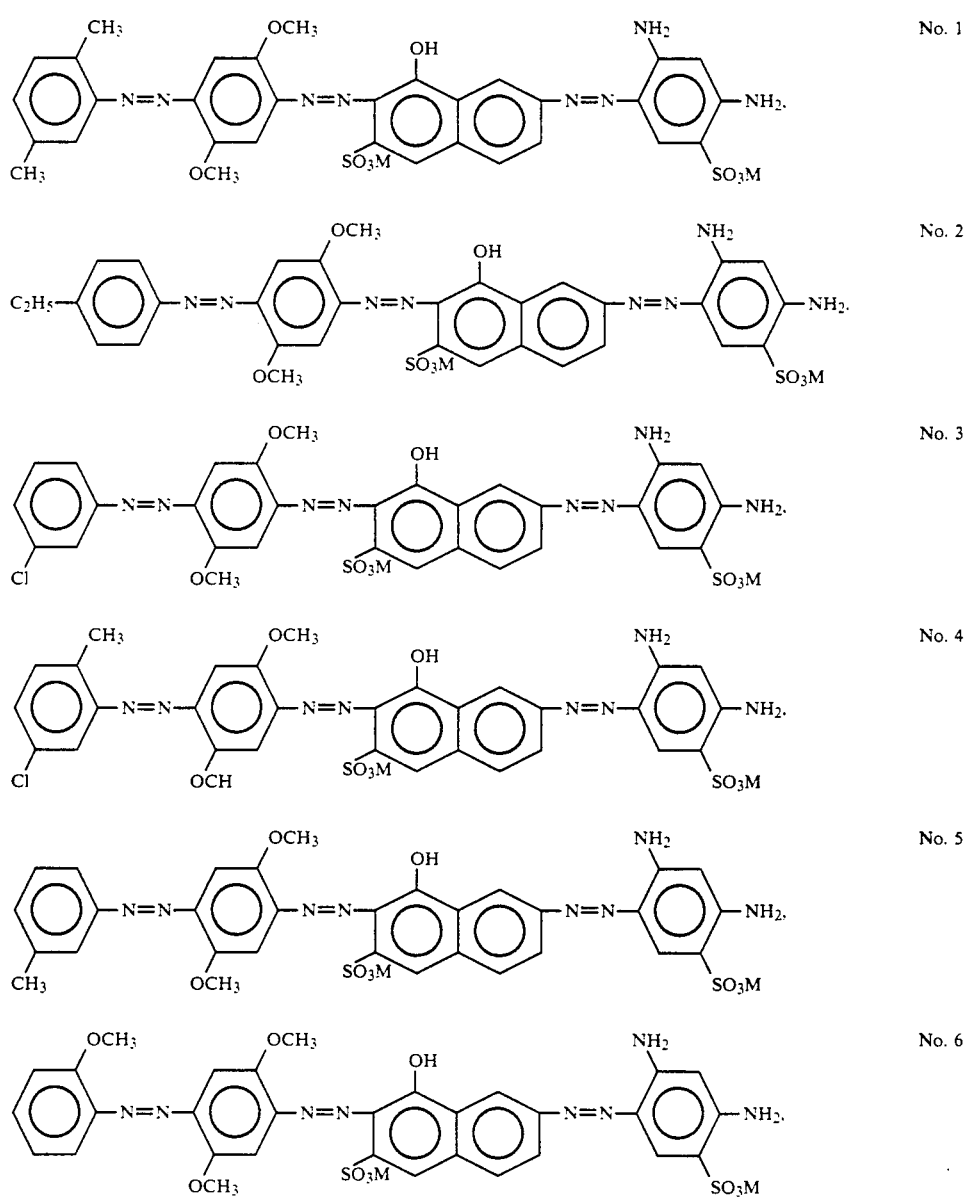

-continued

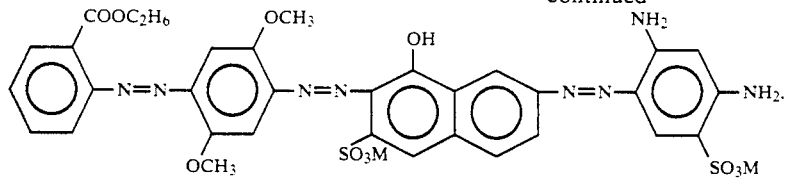
No. 7

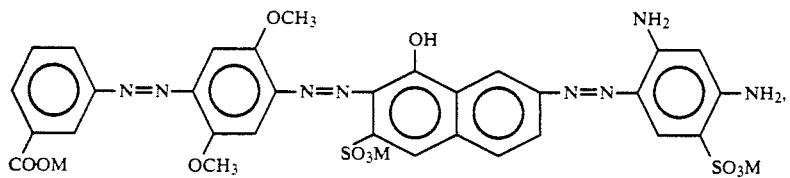
No. 8

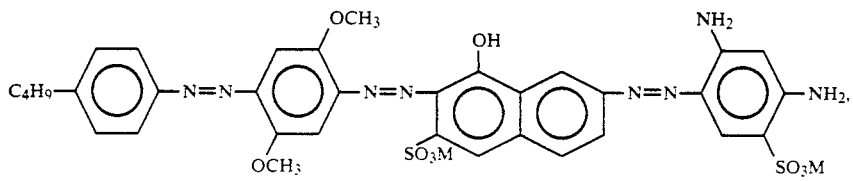
No. 9

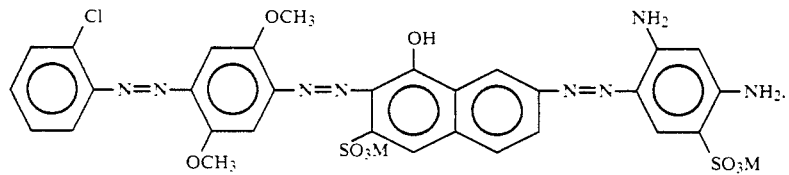
No. 10

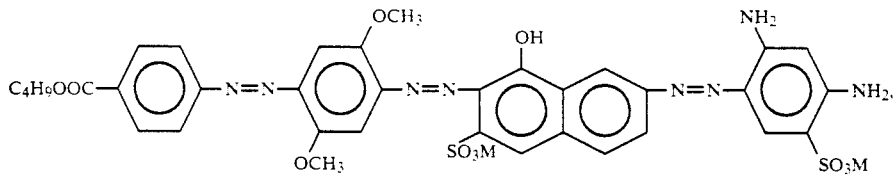
No. 11

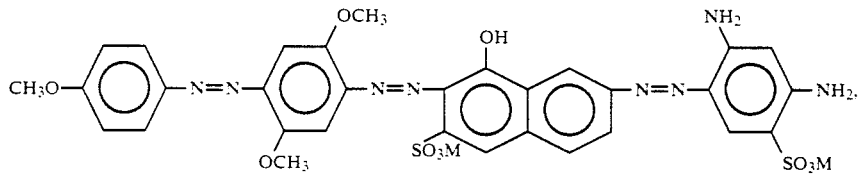
No. 12 wherein M means an alkali metal atom, or an ammonium or organic ammonium ion.

5. An ink comprising a recording agent and a liquid medium dissolving or dispersing the recording agent therein, wherein the ink contains, as the recording agent, an azo compound represented by the formula

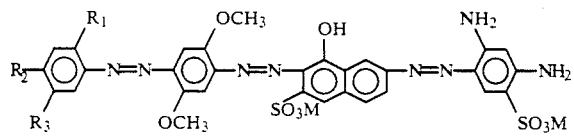

wherein $R_1$, $R_2$ and $R_3$ each are selected from the group consisting of hydrogen, an alkyl having 1 to 4 carbon atoms, methoxy, halogen, COOM and $COOR_4$, and in which $R_4$ is an alkyl having 1 to 4 carbon atoms, and M denotes an alkali metal, ammonium or at least one of ethylammonium and ethanol ammonium.

6. The ink according to claim 5, which contains, as the recording agent, at least one compound selected from the group consisting of the following compounds No. 1 through No. 12:

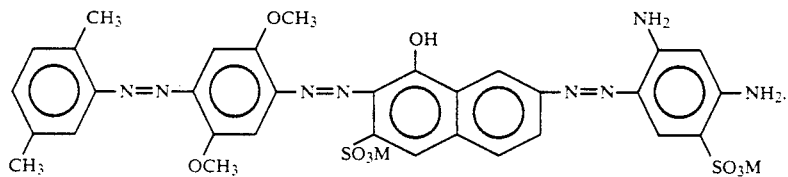
No. 1

-continued
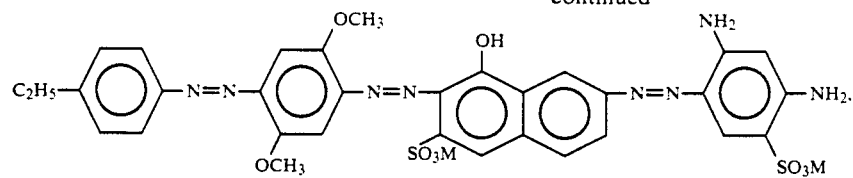 No. 2
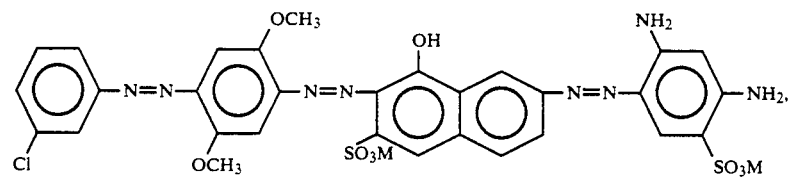 No. 3
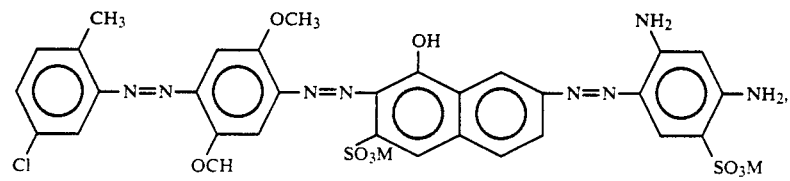 No. 4
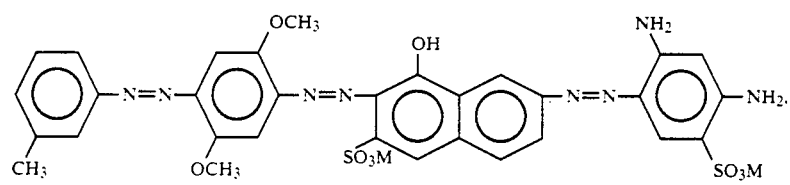 No. 5
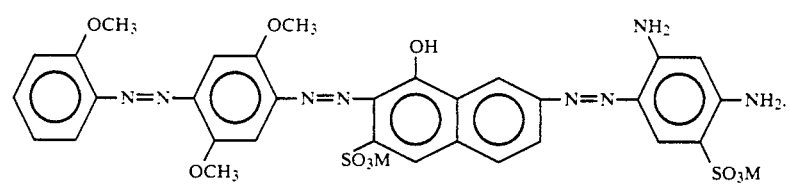 No. 6
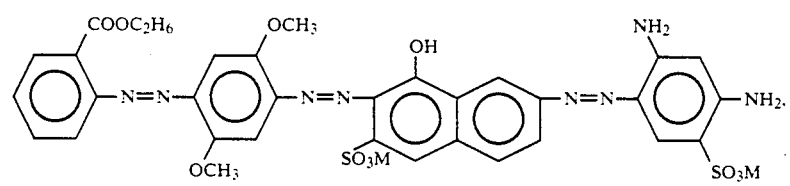 No. 7
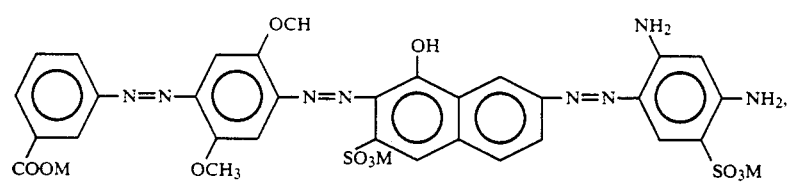 No. 8
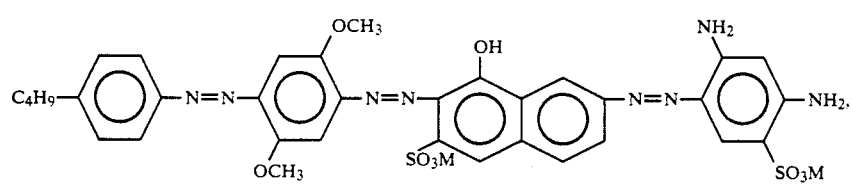 No. 9
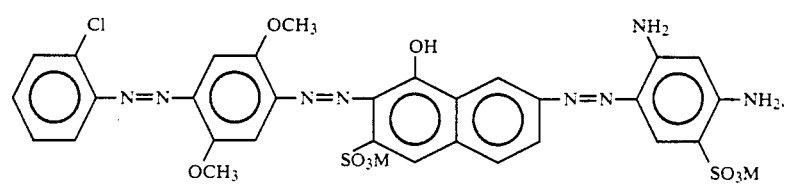 No. 10

-continued

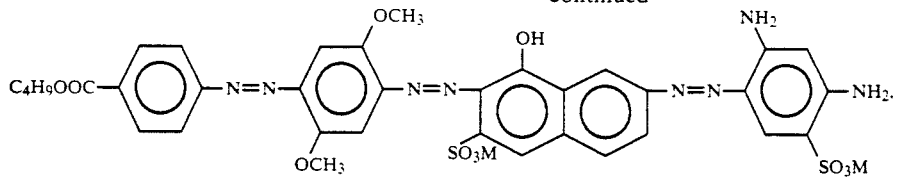

No. 11

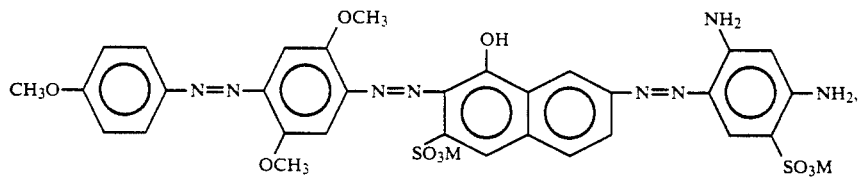

No. 12 wherein M means an alkali metal atom, or ammonium or organic ammonium ion.

7. The ink according to claim 5, wherein the pH of the ink ranges from 4 to 10.

8. The ink according to claim 5, wherein the recording agent is contained in an amount of 0.1 to 15% by weight of the total weight of the ink.

9. The ink according to claim 5, wherein the liquid medium comprises a mixed solvent of water and a water-soluble organic solvent.

10. The ink according to claim 9, wherein the water is contained in an amount of 10 to 97.5% by weight of the total weight of the ink.

11. The ink according to claim 9, wherein the water-soluble organic solvent is contained in an amount of 2 to 80% by weight of the total weight of the ink.

12. The ink according to claim 9, wherein the water-soluble organic solvent comprises at least one glycol.

13. The ink according to claim 12, wherein the glycol is at least one of diethylene glycol and thiodiglycol.

14. The ink according to claim 5, which is used for ink-jet recording.

15. The ink according to claim 14, which comprises at least a recording agent, a water-soluble organic solvent and water.

16. The ink according to claim 15, wherein the water-soluble organic solvent comprises at least one glycol.

17. The ink according to claim 16, wherein the glycol is at least one of diethylene glycol and thiodiglycol.

18. The ink according to claim 17, which comprises, as additives, at least one of 2-propanol and triethanolamine.

19. The according to claim 18, which comprises at least a recording agent, water, thiodiglycol, 2-propanol and triethanolamine.

* * * * *

UNITED STATES PATENT AND TRADEMARK OFFICE
CERTIFICATE OF CORRECTION

PATENT NO.  : 5,258,505
DATED       : November 2, 1993
INVENTOR(S) : Tsuyoshi EIDA et al.

It is certified that error appears in the above-identified patent and that said Letters Patent is hereby corrected as shown below:

COLUMN 1:

Line 11, "specifically" should be deleted; and

Line 45, "to stored" should read --to be stored--.

COLUMN 2:

Line 7, "Lid-Open" should read --Laid Open--;

Line 22, "and to" should read --and the--;

Line 29, "that as" should read --that are--; and

Line 57, "as" should read --with respect--.

COLUMN 3:

Line 26, "general" should be deleted; and

Line 37, "atoms" should read --atoms,--.

COLUMN 4:

Line 9, "general" should be deleted.

COLUMN 5:

Compound No. 4, "OCH" should read --$OCH_3$--.

COLUMN 8:

Compound No. 11, "-$NH_2$" should read -- -$NH_2$, and --.

COLUMN 9:

Compound No. 11-1, "$NH_2$" should read -- $NH_2$, and --.

UNITED STATES PATENT AND TRADEMARK OFFICE
CERTIFICATE OF CORRECTION

PATENT NO. : 5,258,505

DATED : November 2, 1993

INVENTOR(S) : Tsuyoshi EIDA et al.

It is certified that error appears in the above-identified patent and that said Letters Patent is hereby corrected as shown below:

COLUMN 11:

Line 8, "water, com-" should read --water com- --;

Line 9, "pound" should read --ponent--; and

Line 29, "lowe" should read --lower--.

COLUMN 12:

Line 9, "ample" should read --amples--; and "materials," should read --materials--;

Line 10, "paper" should read --papers--;

Line 11, "papers" should read --paper--; and

Line 18, "dots" should read --dots are--.

COLUMN 13:

Line 52, "to" should read --into--;

Line 56, "in to" should read --into--.

COLUMN 18:

Line 26, "59." should read --59%--.

COLUMN 20:

Table 3, "Structure" should read --Structural--.

COLUMN 21:

Table 3, "Structure" should read --Structural--.

COLUMN 25:

Compound No. 4, "OCH" should read --$OCH_3$--;

Compound No. 7, "$COOC_2H_6$" should read --$COOC_2H_5$--.

UNITED STATES PATENT AND TRADEMARK OFFICE
CERTIFICATE OF CORRECTION

PATENT NO. : 5,258,505

DATED : November 2, 1993

INVENTOR(S) : Tsuyoshi EIDA et al.

It is certified that error appears in the above-identified patent and that said Letters Patent is hereby corrected as shown below:

COLUMN 29:

Compound No. 7, "$COOC_2H_6$" should read --$COOC_2H_5$--.

COLUMN 31:

Compound No. 7, "$COOC_2H_6$" should read --$COOC_2H_5$--; and

Compount No. 8, "OCH" should read --$OCH_3$--.

COLUMN 34:

Line 31, "according" should read --ink according--.

Signed and Sealed this

Twenty-sixth Day of July, 1994

Attest:

BRUCE LEHMAN

*Attesting Officer*    *Commissioner of Patents and Trademarks*